(12) United States Patent
Stieglitz

(10) Patent No.: US 10,616,665 B1
(45) Date of Patent: Apr. 7, 2020

(54) AUTOMATED VIDEO LOGGING METHODS AND SYSTEMS

(71) Applicant: Daniel Stieglitz, Monrovia, CA (US)

(72) Inventor: Daniel Stieglitz, Monrovia, CA (US)

(*) Notice: Subject to any disclaimer, the term of this patent is extended or adjusted under 35 U.S.C. 154(b) by 42 days.

(21) Appl. No.: 16/120,101

(22) Filed: Aug. 31, 2018

Related U.S. Application Data

(63) Continuation of application No. 15/405,052, filed on Jan. 12, 2017, now Pat. No. 10,271,111, which is a continuation of application No. 14/694,564, filed on Apr. 23, 2015, now Pat. No. 9,583,149.

(60) Provisional application No. 61/983,225, filed on Apr. 23, 2014.

(51) Int. Cl.
*H04N 21/84* (2011.01)
*H04N 21/845* (2011.01)
*H04N 21/2187* (2011.01)
*H04N 21/44* (2011.01)
*G11B 27/30* (2006.01)
*H04N 21/435* (2011.01)
*H04N 21/433* (2011.01)
*G11B 27/10* (2006.01)
*G06K 9/00* (2006.01)
*H04N 21/8547* (2011.01)
*H04N 21/472* (2011.01)

(52) U.S. Cl.
CPC ......... *H04N 21/84* (2013.01); *G06K 9/00744* (2013.01); *G11B 27/10* (2013.01); *G11B 27/3081* (2013.01); *H04N 21/2187* (2013.01); *H04N 21/433* (2013.01); *H04N 21/435* (2013.01); *H04N 21/44008* (2013.01); *H04N 21/47217* (2013.01); *H04N 21/8455* (2013.01); *H04N 21/8456* (2013.01); *H04N 21/8547* (2013.01); *G06K 2209/01* (2013.01)

(58) Field of Classification Search
CPC .............. H04N 21/84; H04N 21/8456; H04N 21/44008; H04N 21/8547; H04N 21/2187; H04N 21/23418; H04N 21/8455; H04N 21/435; H04N 21/433; H04N 21/47217; G06F 17/30038; G06K 9/00274; G06K 9/00744; G11B 27/3081; G11B 27/10; G11B 2209/01
See application file for complete search history.

(56) References Cited

U.S. PATENT DOCUMENTS 9,319,640 B2 * 4/2016 Ptucha ............... H04N 1/00198
9,467,723 B2   10/2016 Osminer
9,609,373 B2 * 3/2017 Rango .................... G11B 27/10
(Continued)

*Primary Examiner* — David E Harvey
(74) *Attorney, Agent, or Firm* — Law Office of Michael O'Brien; Michael O'Brien; Jack Fritz

(57) ABSTRACT

Exemplary embodiments of systems and methods are provided for automatically creating time-based video metadata for a video source and a video playback mechanism. An automated logging process can be provided for receiving a digital video stream, analyzing one or more frames of the digital video stream, extracting a time from each of the one or more frames analyzed, and creating a clock index file associating a time with each of the one or more analyzed frames. The process can further provide for parsing one or more received data files, extracting time-based metadata from the one or more parsed data files, and determining a frame of the digital video stream that correlates to the extracted time based metadata.

17 Claims, 6 Drawing Sheets

(56) References Cited

U.S. PATENT DOCUMENTS

| | | | |
|---|---|---|---|
| 10,271,111 B2* | 4/2019 | Stieglitz | H04N 21/47217 |
| 2007/0300258 A1* | 12/2007 | O'Connor | A23L 2/52 |
| | | | 725/44 |
| 2009/0284601 A1* | 11/2009 | Eledath | G06K 9/209 |
| | | | 348/157 |
| 2013/0067333 A1* | 3/2013 | Brenneman | G11B 27/105 |
| | | | 715/721 |
| 2014/0187334 A1* | 7/2014 | Crossley | A63F 13/44 |
| | | | 463/43 |
| 2014/0201126 A1* | 7/2014 | Zadeh | A61B 5/4803 |
| | | | 706/52 |
| 2015/0229980 A1* | 8/2015 | Reisner | H04N 21/26233 |
| | | | 725/32 |
| 2017/0054982 A1* | 2/2017 | Vellore Arumugam | H04N 19/132 |

* cited by examiner

AUTOLOG PROCESS

300

AUTOLOG PROCESS
400

AUTOMATED VIDEO LOGGING METHODS AND SYSTEMS

RELATED APPLICATION

This application is a continuation of U.S. Non-Provisional patent application Ser. No. 15/405,052, filed on Jan. 12, 2017. The '052 application is a continuation of U.S. Non-Provisional patent application Ser. No. 14/694,564, filed on Apr. 23, 2015, which in turn relates to and claims priority from U.S. Provisional Patent Application Ser. No. 61/983,225 filed Apr. 23, 2014, the entire disclosure of both applications is hereby incorporated herein by reference.

BACKGROUND

The present disclosure relates to exemplary embodiments of methods and systems for providing metadata, and more particularly, to exemplary embodiments of methods and systems for automatically creating time-based metadata associated with a video clip.

In video management and processing systems, a video clip can be stored along with a database containing time-based metadata (e.g., data associated with instants of time relative to the start of a video clip). Time-based metadata can be specified in relative terms, and is generally by a frame number relative to the start of the video clip. In some systems, a time code value can be used which can specify hours, minutes, seconds and a frame number relative to the last second.

These data can be referred to as the "metadata" of the media; that is, if the video clip is considered the primary data, the "metadata" can be a data set that relates to the video clip directly but may not be a part of the primary data. An example of such metadata is a data triple comprised of the values: 100, 11:45 and "two-pointer," where the triple indicates, respectively: the frame number relative to the start of the video clip, game time for the current game period (e.g. in a basketball game) and the latter describes what is being portrayed in the video clip. The metadata can be any information from text to images to audio and/or video data.

The database of time-based metadata can be used to quickly recall the video clip and to find specific elements the user is interested in within a video clip. Additionally, interactive television applications can rely on time-based metadata to provide timely, relevant content to users who are watching the video media either on a primary display, or a secondary display such as a tablet, laptop or smartphone.

Many sources of data exist that can be used to create time-based metadata. For example, a scorecard for a sporting event where each event in the game is associated with the time remaining in that segment of the game, or a data stream, including a social media (e.g., Twitter® or Facebook®) data stream, wherein users post about players or actions and those posts contain temporal information about the players or actions (e.g., a server-generated time stamp on the post and/or descriptive text about the time in the game written by the author of the post). Similarly, third-party data providers exist that supply suitable data feeds for certain events, for example sporting events, as a service that can be leveraged to create time-based metadata.

Acquisition of metadata, which can be referred to as "logging," can generally be achieved by having users manually associate data with a particular time index in a stream of a video clip. For example, a user can watch a video clip on a display device and input tags with time-based metadata into a database via a computer keyboard and mouse controls, or other type of electronic device. The metadata may be typed as text or the user may depress or click a button containing a tag to perform the metadata association.

In, e.g., sports broadcasting, the timely association of metadata to video is important to the development of consumer products and the industry as a whole. Video metadata enables the rapid search and retrieval of video clips used during live sports broadcasts, scripted commentary shows and on social media. The two primary concerns of content owners are (i) the quality of the metadata and (ii) minimizing the total production time of the clips.

For example, in order to promote a live game on television, a broadcaster may publish clips of the game on social media. The clips must be published with enough time to allow the viewer to watch the game on television. Additionally, for discussion during breaks of the game, on-air radio or television commentators or fans may wish to review clips that may have occurred seconds before, and retrieve previous occurrences of similar clips to add value to the discussion.

Currently, video metadata is acquired using human input which inhibits the ability of content owners or publishers to process all of the required data and accurately acquire video metadata in a timely fashion.

SUMMARY

At least some of the above described problems can be addressed by exemplary embodiments of the methods and systems according to the present disclosure. Exemplary embodiments of systems and methods are provided for automatically creating time-based video metadata for a video source and a video playback mechanism. The systems and methods can provide for identification of a region, or multiple regions, in a frame of a video that contains metadata information, extracting and processing those regions to conform to input to a computer vision system, using computer vision techniques to transform that image data into machine readable data with an associated video time index, and extracting data from an accompanying data stream having similar metadata that can be matched to the data extracted from the video.

In some exemplary embodiments, an automated video logging system can be provided, comprising a logging client for receiving a digital video stream, wherein the logging client analyzes one or more frames of the digital video stream, extracts a time from each of the one or more frames analyzed, and creates a clock index file associating a time with each of the one or more analyzed frames. The logging client can further provide the clock index file for storage to a database. The digital video stream can be a live stream. The logging client can automatically detect coordinates of a clock on each of the one or more frames analyzed to extract the time from each of the one or more frames using one or more computer vision techniques.

The automated video logging system can further comprise a server for providing the digital video stream to the logging client. The logging client and the server can be connected over a network, and the digital video stream can be provided from the server to the logging client through the network. The server can comprise one or more servers.

The logging client can assign a sequential frame number to each of the one or more frames analyzed of the digital video stream. The logging client can parse one or more data files, and extract time-based metadata from the one or more parsed data files. The logging client can determine a frame of the digital video stream that correlates to the extracted time based metadata. The logging client can query the clock index file to associate a time with the extracted time-based metadata to determine the frame of the digital video stream that correlates to the extracted time based metadata. The one or more data files can be received from a real time server. The one or more data files can be stored in a database.

In some exemplary embodiments, an automated logging process can be provided, comprising receiving a digital video stream, analyzing one or more frames of the digital video stream, extracting a time from each of the one or more frames analyzed, and creating a clock index file associating a time with each of the one or more analyzed frames.

The automated logging process can further comprise parsing one or more received data files, and extracting time-based metadata from the one or more parsed data files. The one or more data files can be received from a real time server. The automated logging process can further comprise determining a frame of the digital video stream that correlates to the extracted time based metadata. The automated logging process can further comprise querying the clock index file to associate a time with the extracted time-based metadata to determine the frame of the digital video stream that correlates to the extracted time based metadata.

The automated logging process can further comprise creating a log entry of the extracted time based metadata with the correlated frame and the time associated with each of the frames, and storing the log entry in a database. The automated logging process can further comprise automatically detecting coordinates of a clock on each of the one or more frames analyzed to extract the time from each of the one or more frames using one or more computer vision techniques.

BRIEF DESCRIPTION OF THE FIGURES

The foregoing and other exemplary objects of the present disclosure will be apparent upon consideration of the following detailed description, taken in conjunction with the accompanying exemplary drawings and claims, in which like reference characters refer to like parts throughout, and in which:

Figure 1:
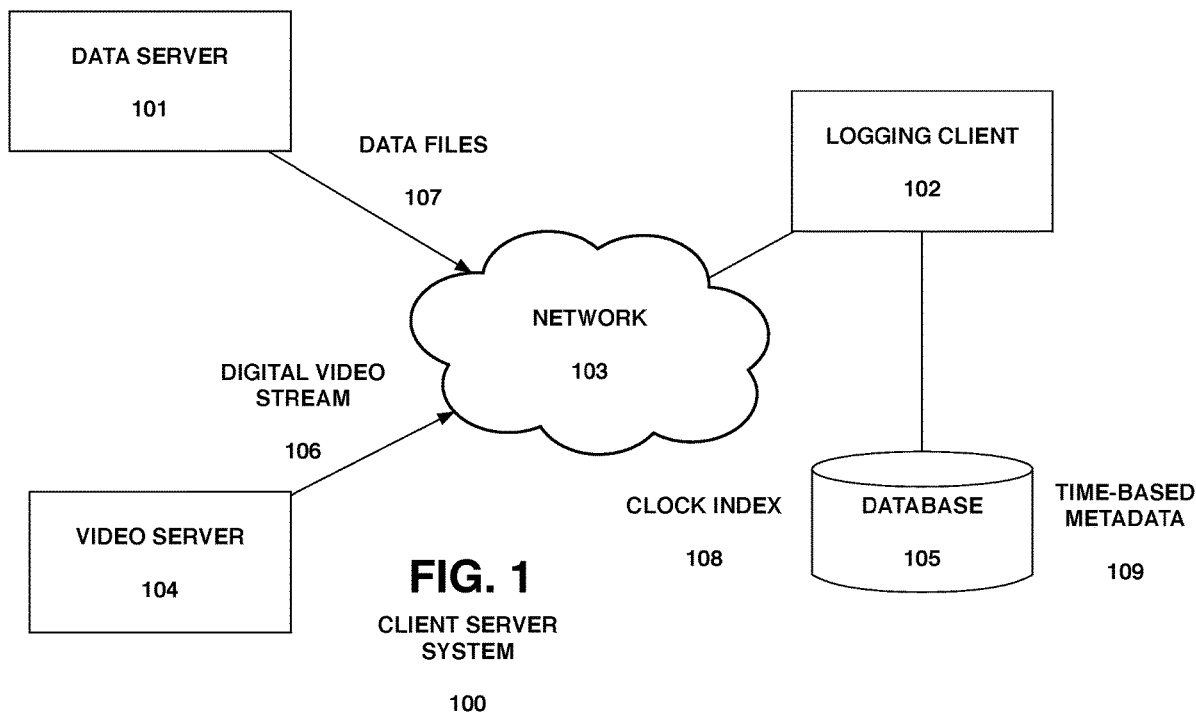
FIG. 1 is a schematic diagram of a client server system according to an exemplary embodiment of the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative embodiments. It is intended that changes and modifications can be made to the described embodiments without departing from the true scope and spirit of the subject disclosure.

DETAILED DESCRIPTION OF CERTAIN EMBODIMENTS

Exemplary embodiments of the methods and systems of the present disclosure will now be described with reference to the figures. The following description of the various embodiments is merely exemplary in nature and is in no way intended to limit the scope of the disclosure, its application, or uses.

FIG. 1 is a schematic diagram of a client server system according to an exemplary embodiment of the present disclosure. FIG. 1 can provide for, e.g., an implementation of an exemplary embodiment of an automated video logging system. A client server system 100 can include, e.g., a data server 101, a video server 104, a computer network 103, a logging client 102, and a database 105. Streams of information, such as data files 107 and digital video stream 106, can be provided from the data server 101 and video server 104, respectively, through the network 103 and into the logging client 102. In some exemplary embodiments, the digital video stream 106 may comprise a digital video stream, such as but not limited to, an rtmp stream. In some embodiments, the digital video stream 106 may comprise a digital video file, such as but not limited to, an mpeg file. In some exemplary embodiments, the data files 107 can be complete files residing on a computer storage medium connected to the data server 101 and accessible over the network 103. In some exemplary embodiments, the data files 107 can be spread across multiple files located on a computer storage medium connected to multiple data servers 101 and accessible over the network 103 or over the Internet. In some embodiments, the data files 107 and the digital video stream 106 can be combined into a single information stream containing both video and data information.

In some exemplary embodiments, the logging client 102 can be implemented as a single server system, and in some embodiments it can be implemented as a distributed system of multiple servers. In some embodiments, the data server 101 can be implemented as a single server system, and in some embodiments it can be implemented as a distributed system of multiple servers. In some embodiments, the video server 104 can be implemented as a single server system, and in some embodiments it can be implemented as a distributed system of multiple servers.

In some embodiments, the data server 101 can crawl the Internet, and perform live searches or otherwise discover time-based information relative to the video stream being processed by the logging client 102. For live or recorded events, the time-based information can include a user's public social media (e.g., Twitter®, Facebook®), or similar public posts on the Internet, or any other time stamped information publicly available on the Internet. In some embodiments, the data server 101 can be provided by a third-party commercial data service or similar distributed information system or service. In some embodiments, the data server 101 may be part of a manual logging system where users have entered data using computer keyboard and mouse equipment, or any other type of computer equipment.

In some embodiments, the data server 101 can push data through the network 103 to the logging client 102. In some embodiments, the data server 101 can provide an application programming interface ("API") to the logging client 102 so that the logging client 102 may query the data server 101 for relevant data. In operation, the data server 101 can provide data files 107 to the logging client 102 through the network 103. In some embodiments, the data server 101 can provide data files 107 to the logging client 102 on a shared disk or other storage medium connected to the systems. Data files 107 can be a set of data that the system will match to internal metadata extracted from the video clip using optical character recognition techniques (or other computer vision techniques, such as but not limited to face detection, face recognition, motion analysis) on video clip. Data files 107 can contain external metadata that can be associated with a real-time value portrayed in the video clip, for example, "10 seconds to go in the first quarter" of a sporting event, such as a basketball game.

In some embodiments, the video server 104 can stream data live through network 103 to the logging client 102 using standard video streaming protocols, for example, RTMP (Real Time Messaging Protocol) or HLS (HTTP Live Streaming) In some embodiments, the video server 104 can provide a complete video file that has previously been recorded or digitized through the network 103 to the logging client 102. In operation, the digital video stream 106 can be provided to the logging client 102 through the network 103. In some embodiments, the digital video stream 106 can be stored as a video file on a shared disk or other storage medium connected to the systems.

The logging client 102 can be a computer system comprised of a processor, memory and file system that runs the executable software code described herein. A database 105 can be provided, having a set of files and a structure in which data can be stored, retrieved and otherwise managed. In some embodiments, a third-party vendor can provide the database 105, and in some embodiments it can have solely text files on a file system. In operation, a combination of databases can be used in concert, where databases of single and distributed systems can work together.

Figure 2:
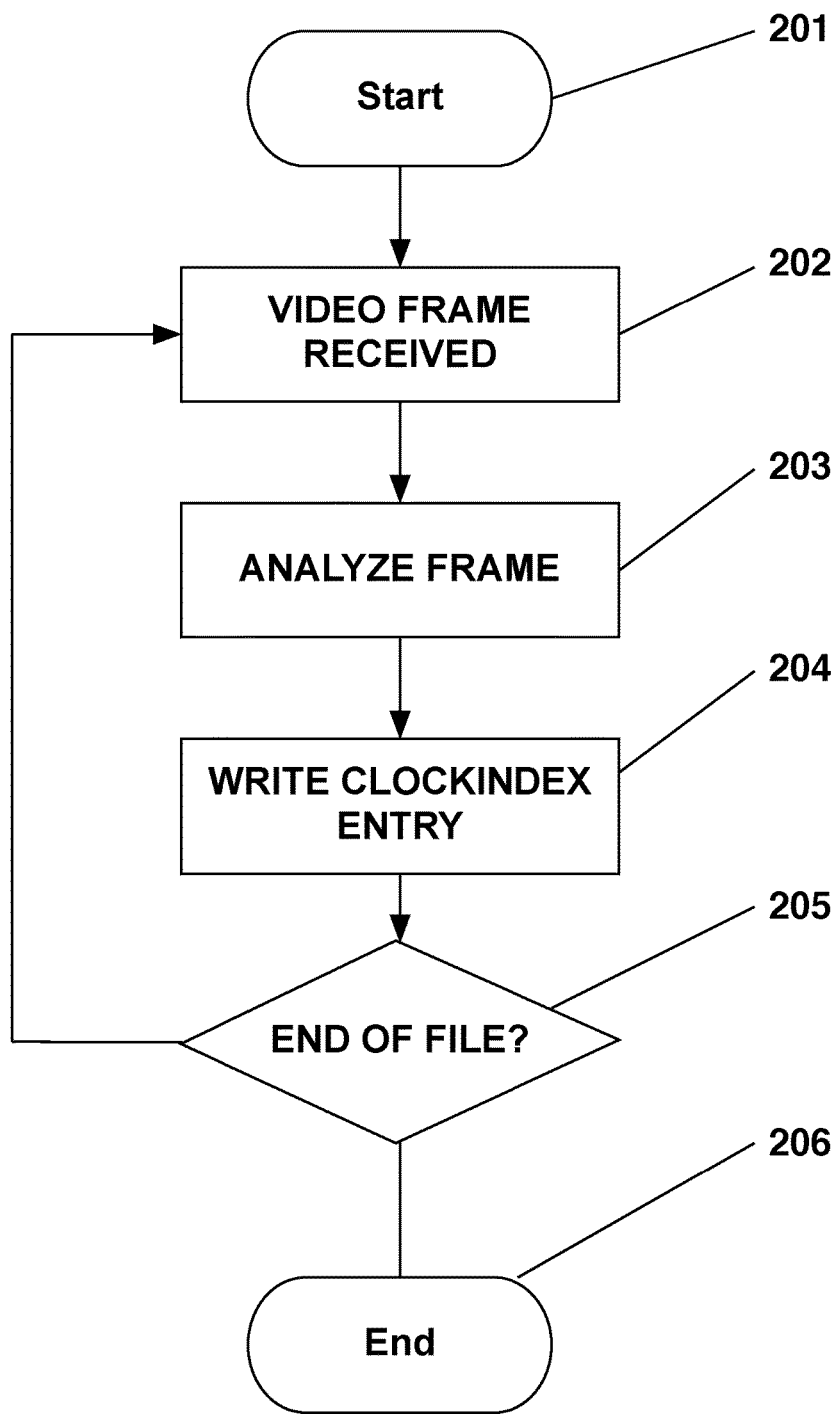
FIG. 2 is a flowchart of a video process according to an exemplary embodiment of the present disclosure.

FIG. 2 is a flowchart of a video process according to an exemplary embodiment of the present disclosure, illustrating a processing algorithm of a video process 200, which can extract time data from a video frame and produce clock index data. The video process 200 can process the digital video file or stream 106, and can extract machine readable time data from the video frame image data. In operation, the logging client 102 can process the digital video stream 106, frame-by-frame as illustrated in FIG. 2, to produce the clock index file 108, which can be stored in database 105. The clock index file can contain the frame number and the time associated with each of the frame numbers. In some embodiments, the operator of the system can specify to the video process 200 where on the frame the clock (or similar time display) can be found by supplying the left, top, width and height coordinates to the video process 200. In some embodiments, the operator of the system can supply the left, top, right, and bottom coordinates of the bounding rectangle to the video process 200. In some embodiments, the video process 200 may automatically determine the coordinates of the bounding rectangle in the frame where the relevant information is using computer vision techniques.

Figure 5:
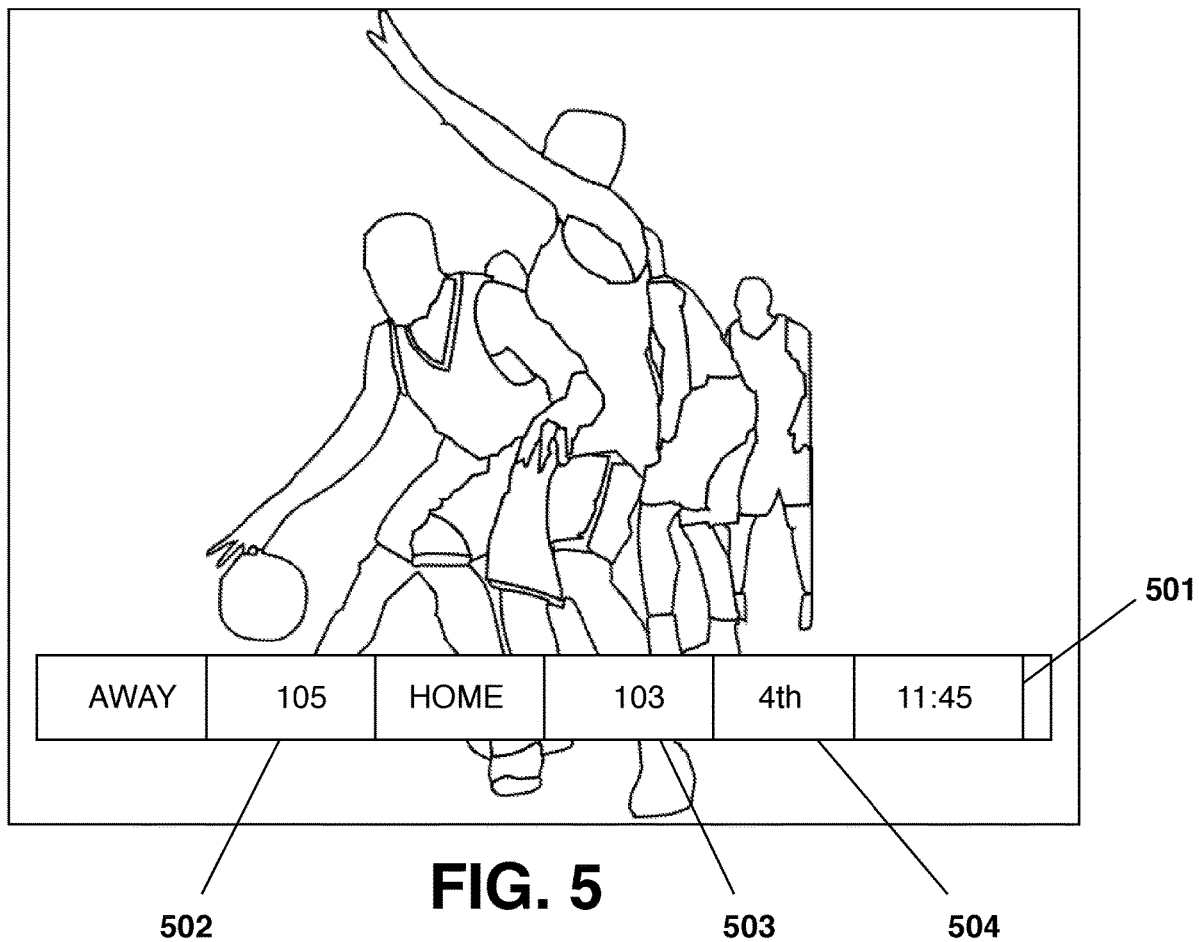
FIG. 5 is an exemplary illustration of a video frame illustrating on-screen text that can be turned into time-based metadata according to an exemplary embodiment of the present disclosure.

In some exemplary embodiments, at a start 201, when a video frame is received from a stream or loaded from a file at 202, the logging client 102 can run a video process 200 that can analyze the digital video stream 106 frame-by-frame at 203. When the video process 200 first starts analyzing the digital video stream 106, it assigns a frame number offset of zero (0) to that frame. In operation, the video process 200 may begin for a digital video stream or file 106 where processing has already occurred for previous frames and some clock index data 108 may already exist. In some embodiments, the video process 200 may assign a frame number offset based on the last frame number offset present in the clock index file 108. At 203, the video process 200 digitally extracts into computer memory and processes the region identified as containing, for example, an on-screen clock (e.g., 501 as illustrated in FIG. 5, providing an exemplary illustration of a video frame illustrating on-screen text that can be turned into time-based metadata), and performs computer image processing to prepare it for computer vision processing. Once transformed, computer vision processing (e.g., optical character recognition) can be performed on the extracted image region, which can extract machine-readable information from the extracted image region. At 204, the video process 200 can write the resulting recognized time string to the clock index file, along with the corresponding frame number offset from the start of the video clip. The frame number offset can be incremented by one after each frame is processed at 205 so that the correct frame number offset is associated with each video frame subsequently received by the algorithm at 202.

In some exemplary embodiments of the present disclosure, video time code information can be present in internal metadata found in the digital video stream 106. The video time code information can be extracted at 203 during the processing of the frame received at 202 by the video process 200. At 203, the video process 200 digitally extracts into computer memory and processes the region identified as containing, for example, an on-screen clock (e.g., 501 as illustrated in FIG. 5, providing an exemplary illustration of a video frame illustrating on-screen text that can be turned into time-based metadata), and performs computer image processing to prepare it for computer vision processing. Once transformed, computer vision processing (e.g., optical character recognition) can be performed on the extracted image region, which can extract machine-readable information from the extracted image region. At 204, the video process 200 can write the resulting recognized time string to the clock index file, along with the corresponding video time code information extracted from the digital video stream 106.

In some exemplary embodiments of the present disclosure, at a start 201, when a video frame is received at 202, the logging client 102 can automatically discover the region on the screen that contains the on-screen clock (e.g., 501, as illustrated in FIG. 5, providing an exemplary illustration of a video frame illustrating on-screen text that can be turned into time-based metadata) using e.g., computer vision, optical character recognition and computer logic to find the region that contains the graphical representation of a clock value. Once this region is identified automatically, machine-readable information can be extracted from the image region. At 204, the video process 200 can write the resulting recognized time string to the clock index file, along with the corresponding frame number offset from the start of the video clip, or video time code information extracted from the digital video stream 106.

Figure 6:
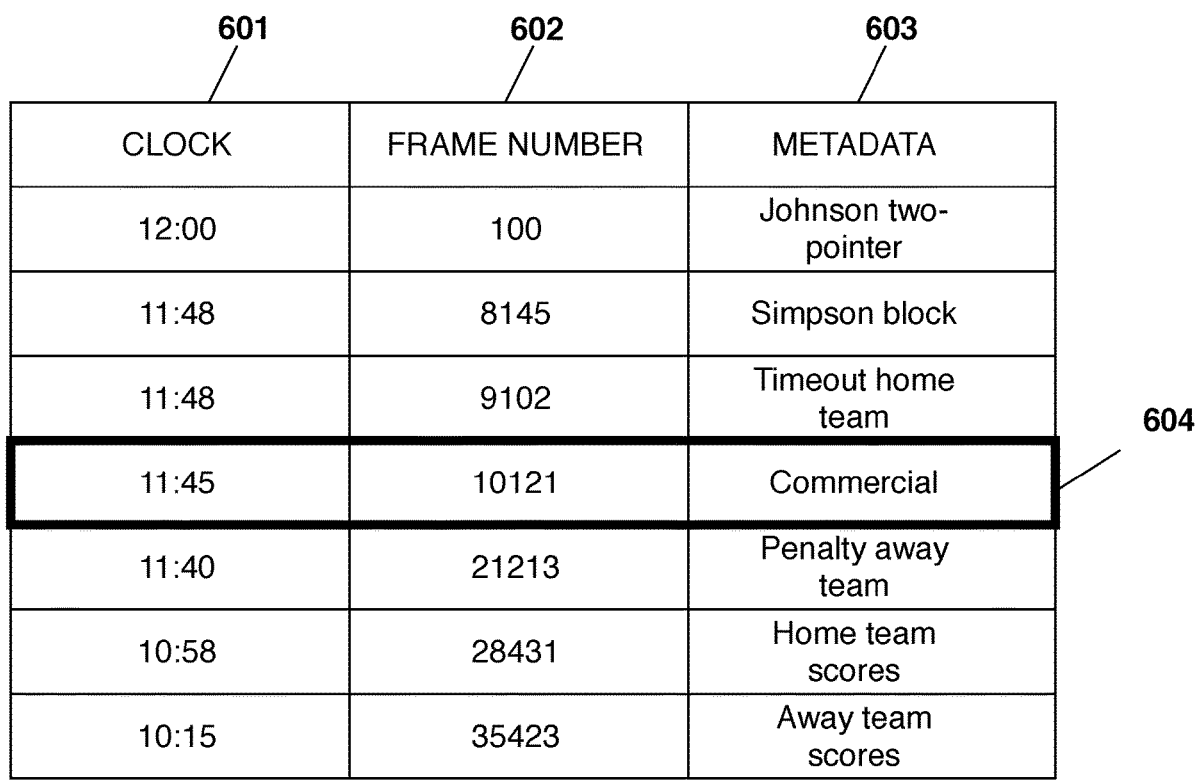
FIG. 6 is an exemplary illustration of a table showing an output of a video process and an auto-logging process according to an exemplary embodiment of the present disclosure.

An exemplary output of the video process 200 is illustrated in FIG. 6, which provides an exemplary illustration of a table showing an output of a video process and an auto-logging process as a combined table with time-based metadata 603. Various different outputs of the video process 200 and methods of data representation extracted from a computer database are contemplated by the present disclosure, and are not limited to the exemplary embodiments illustrated in FIG. 6. The video process 200 can populate the data columns illustrated in FIG. 6, with the computer vision recognized clock times 601 and the frame number 602 offset from the start of the video clip. When the end of the video stream is reached at 205, then the video process 200 can end at 206. In addition to clock times, in some embodiments of the present disclosure, the video process 200 can perform computer vision processing on additional regions of the frame at 502 (e.g., a score of an away team), 503 (e.g., a score of a home team), and 504 (e.g., the quarter or period in the game), in order to extract additional metadata in order to better determine the time portrayed in the media. In some embodiments of the present disclosure, certain time code data may be present in the video stream, and such time code data can be extracted during the video process 203 and associated with the time-based metadata along with the frame number 602 (e.g., the video time code in the form of hours, minutes, seconds and frames, or any other used format).

Figure 3:
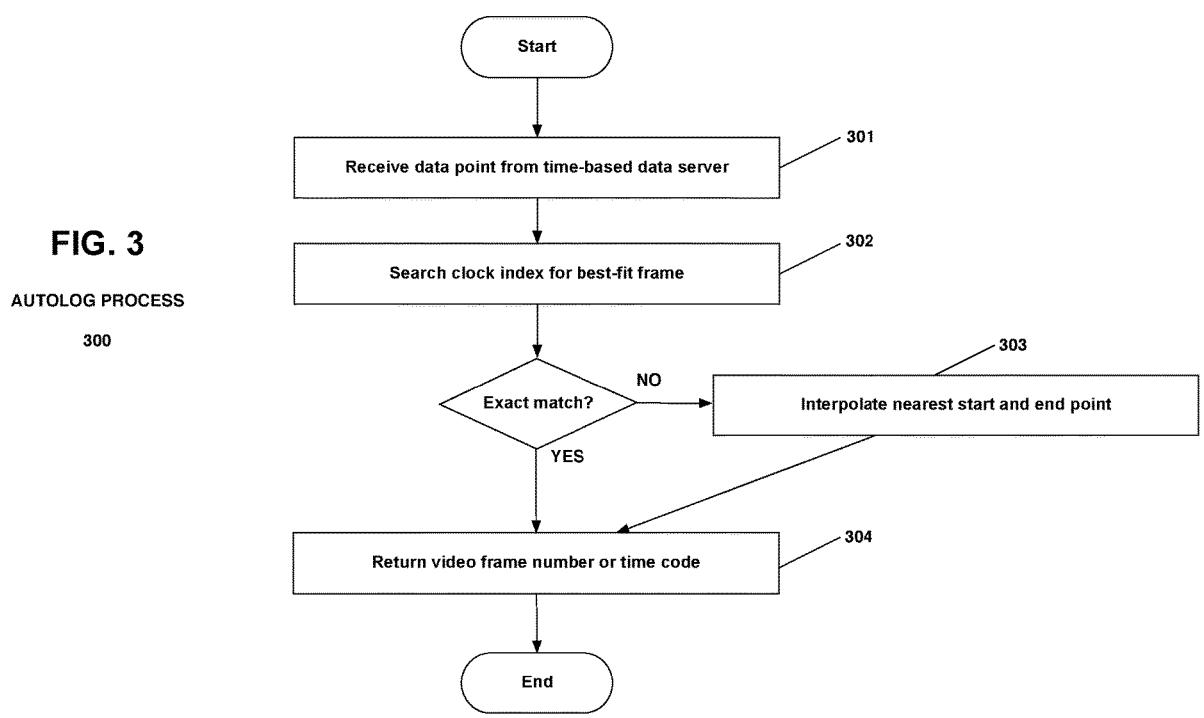
FIG. 3 is a flowchart of an auto-logging process according to an exemplary embodiment of the present disclosure.

FIG. 3 is a flowchart of an auto-logging process according to an exemplary embodiment of the present disclosure, illustrating an algorithm that can be used to match events represented in the external metadata found in data files 107 to the clock index data 108, which can produce automatically generated, time-based video metadata 109, that can then be stored in the database 105. The data server 101 can produce data in real-time as events occur in real life. The logging client 102 can execute an auto-logging process 300. The auto-logging process 300 can receive data files 107 (e.g., time left, period in the game, score, type of play or description of play) from a time-based server (i.e., live data server) at 301, and parse the data files 107 and extract time-based metadata from those files. The auto-logging process 300 can then query the clock index 108 stored in the database 105 to find the best-fit video frame that matches the time extracted from the data files 107 at 302. If an exact match is found, the auto-logging process 300 can return the video frame number or time code of the matching clock index row at 304. If there is no exact match in the database, then the auto-logging process 300 can determine the best-fit frame by interpolating the frame numbers and applying a statistical estimate of the best-fit frame at 303. For example, the auto-logging process 300 can split the difference between the frames immediately before and following the requested clock index. The auto-logging process 300 can then return the video frame at 304. The auto-logging process 300 can create a log entry, such as a row 604 illustrated in FIG. 6, that associates the time index from the data files 107 with the frame number from the digital video stream 106, and can store that log entry in the database 105 as the time-based metadata 109.

In some embodiments, the video process 200 and the auto-logging process 300 can be implemented as a same software process running on a CPU, while in other embodiments the video process 200 and the auto-logging process 300 can be separate software processes running on either a single system, or multiple distributed systems.

Figure 4:
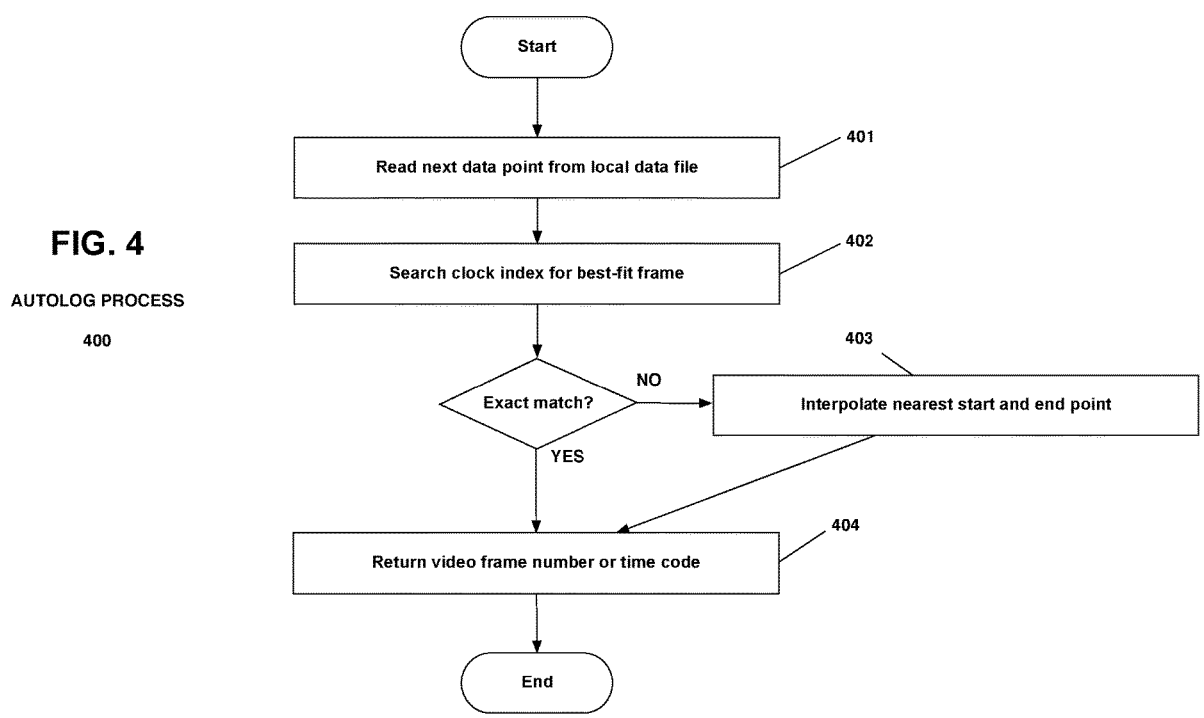
FIG. 4 is a flow diagram of an auto-logging process according to an exemplary embodiment of the present disclosure.

FIG. 4 is a flow diagram of an auto-logging process according to an exemplary embodiment of the present disclosure, illustrating an algorithm that can be used to match data stream events to the clock index data, which can produce the automatically generated, time-aligned video metadata. The auto logging process 400 can be provided in some embodiments where the data server 101 has already produced and stored data files 107, and these files are stored on a file system accessible to the logging client 102 either on the same physical machine or over a network. In these embodiments, the auto logging process 400 can read the pre-prepared data files 107 at 401, and can align the clock times enumerated in the pre-prepared data files with the output from the video process 200, namely, the clock times extracted through computer vision processing, frame numbers, and/or video time codes. The auto-logging process 400 can then query the database 105 to find the best-fit video frame that matches the time extracted from the data files 107 at 402. If an exact match is found, the auto-logging process 400 can return the video frame number or time code of the matching clock index row at 404. If there is no exact match in the database, then the auto-logging process 400 can determine the best-fit frame by interpolating the frame numbers and applying a statistical estimate of the best-fit frame at 403. The time-based metadata 109 can then be queried by a video retrieval or query system to return specific video clips or segments at 404 based on metadata extracted automatically from the data files 107.

In some embodiments, time-based metadata 109 can interface with a system such as a media asset management system where video clips and time-based metadata can be stored together. The media asset management system can present a user interface to operators of the system to view the automatically generated, time-aligned metadata and the corresponding video clip. In some embodiments, the auto logging process 400 can run continuously as the event unfolds and when the time-based metadata 109 becomes available, the media asset management system can present the auto logged clip to a user. In some embodiments, where the event being recorded has occurred and the auto logging process 400 has been completed, all auto logged clips and time-based metadata can be available for review in the media asset management system. The media asset management system can provide an interface through which a user can search the automatically generated, time-aligned metadata and retrieve specific clips based on the metadata attached to each entry present clock index 108 also referenced in data files 107.

The data files 107 may contain inaccurate information due to data acquisition, user error, or other problems. Additionally, certain events may occur in the video that are of interest to the user but may not be logged automatically by the auto logging process 400. In some embodiments, a correction workflow can be provided to allow the user to review, edit and correct errors present in the data files 107, errors introduced by the auto logging process 400, and/or omissions in the data files 107. The correction workflow can be embodied by a user interface that can present video clips to the user as they are automatically logged, requesting visual confirmation that the content of the video clips match the automatically logged, time-aligned metadata. If the user confirms that the data is correct, the time-based metadata 109 can be updated to reflect the confirmed data. In some embodiments, the user can adjust the frame number or time code of the clip, and/or the metadata itself, and submit the corrected, time-aligned metadata to the database 105.

Various advantages can be provided for in the exemplary embodiments of the present disclosure. For example, instead of manually inputting metadata using computer keyboard and mouse equipment while watching a video clip, the present disclosure describes exemplary embodiments of methods and systems that can provide a video logging system that can automatically create time-based metadata by, e.g., processing the video clip with a computer vision system. The exemplary embodiments of the present disclosure can further provide a system and method for applying algorithms to convert data acquired by third parties into video metadata using computer vision techniques. The converted metadata can consist of a higher density of information than can be acquired by a human in real-time, and can be acquired from high quality sources to ensure accuracy. This system and method can enable timely and accurate association of video metadata to live or recorded video, thereby facilitating new and higher quality products and services for consumers.

The automated video logging system can comprise a server that can receive a digitized video clip or digitized video stream over a computer network, and a corresponding data file or stream containing real time values and data representing times and events portrayed in the video clip. The automated video logging system can also contain a computer software process that can analyze the video, extract time data from a clock displayed on the video frame, and/or analyzes the image using, e.g., optical character recognition (OCR).

In some exemplary embodiments of the present disclosure, the automated video logging system can receive a data file from a third-party provider, e.g. the official data collector for a sports league, containing real time values portrayed in the video clip (e.g., a play-by-play report for a sporting event with game period and time remaining data), and automatically assign a frame number or a video time code from the video to each event specified in the data file.

In some exemplary embodiments of the present disclosure, the automated video logging system can scan social media sites (e.g., Twitter® or Facebook®), sports web sites, or other similar public Internet data stream for relevant events, extract time-based metadata from those events using common data extraction and processing methods, natural-language processing methods or similar computer recognition techniques, and automatically assign a frame number or video time code from the video to each event specified in the data file.

In some exemplary embodiments of the present disclosure, the automated video logging system can receive a data file from a manual logging system, such as the Hapn.in™ system developed by Stainless Code, where users can enter data using computer keyboard and mouse equipment, and the automated video logging system can automatically assign a frame number or a video time code from the video to each event specified in the data file.

Various other considerations can also be addressed in the exemplary applications described according to the exemplary embodiments of the present disclosure. The exemplary embodiments of the present disclosure can be used in various configurations and in different systems. Various computing arrangements can be provided, having a processor(s) configured or programmed to perform the exemplary steps and/or procedures of the exemplary embodiments of the present disclosure described above. Various data described above can be stored in various storage arrangements (e.g., hard drive, memory device, such as RAM, ROM, memory stick, floppy drive, and/or other tangible computer-accessible medium). The processor(s) can access the storage arrangement(s) to execute a computer program or a set of instructions (stored on or in the storage arrangement) which can perform the procedures according to the exemplary embodiments of the methods and systems of the present disclosure.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, manufacture and methods which, although not explicitly shown or described herein, embody the principles of the disclosure and are thus within the spirit and scope of the disclosure. The disclosures of all systems, documents and publications cited herein are hereby incorporated herein by reference in their entireties.

What is claimed is:

1. A system that is adapted to create a clock index; the system comprising:
   a logging client, operatively coupling to a network wherein the logging client receives a video frame from the network and the network receives the video frame from a video server;
   a data server, communicatively coupled to the logging client through the network;
   data files, stored in the data server, and further comprising external metadata;
   wherein the logging client is programmed with instructions to:
   analyze the video frame with the logging client;
   extract a time value from the video frame analyzed;
   receive a time-based metadata from the data files;
   associate a time with an assigned identifier value for the video frame and the time-based metadata in a database connected to the logging client;
   associate external metadata within the data files with the time value;
   index the time-based metadata with the assigned identifier value.

2. The process of claim 1, further comprising searching content of the video frame to produce internal metadata.

3. The process of claim 2, wherein searching the video frame for the internal metadata includes recognizing faces of individuals on the video frame.

4. The process of claim 2, wherein searching the video frame for the internal metadata includes extracting text as the internal metadata.

5. The process of claim 2, wherein searching the video frame for the internal metadata includes extracting graphics as the internal metadata.

6. The process of claim 2, wherein searching the video frame for the internal metadata includes extracting audio data as the internal metadata.

7. The process of claim 2, wherein searching the video frame for the internal metadata includes extracting the locations of people depicted in the video as the internal metadata.

8. The process of claim 2, wherein searching the video frame for the internal metadata includes extracting the relative locations of objects depicted in the video as the internal metadata.

9. The process of claim 8, further comprising extracting the relative position of people in the video to a fixed object.

10. The process of claim 9, wherein the fixed object is a basketball court.

11. The process of claim 2, wherein the internal metadata is at least one subtitle.

12. The process of claim 1, wherein the video frame is obtained from a live stream.

13. The process of claim 1, wherein extracting the time from the video frame analyzed further comprises searching the video frame.

14. The process of claim 13, wherein searching the video frame further comprises automatically detecting coordinates of a clock on each video frame analyzed to extract the time from each video frame using optical character recognition.

15. The process of claim 1, wherein the logging client pulls the time-based metadata from a data server through a query.

16. The process of claim 1, wherein the logging client pulls the time-based metadata from a data server through an application programming interface.

17. The process of claim 1, wherein the data files are obtained from a sensor.

\* \* \* \* \*

UNITED STATES PATENT AND TRADEMARK OFFICE
CERTIFICATE OF CORRECTION

| | |
|---|---|
| PATENT NO. | : 10,616,665 B1 |
| APPLICATION NO. | : 16/120101 |
| DATED | : April 7, 2020 |
| INVENTOR(S) | : Daniel Stieglitz |

It is certified that error appears in the above-identified patent and that said Letters Patent is hereby corrected as shown below:

In the Claims

On Column 10, Line 28 through Column 11, Line 5 should read as follows:

2. The system of claim 1, further comprising searching content of the video frame to produce internal metadata.

3. The system of claim 2, wherein searching the video frame for the internal metadata includes recognizing faces of individuals on the video frame.

4. The system of claim 2, wherein searching the video frame for the internal metadata includes extracting text as the internal metadata.

5. The system of claim 2, wherein searching the video frame for the internal metadata includes extracting graphics as the internal metadata.

6. The system of claim 2, wherein searching the video frame for the internal metadata includes extracting audio data as the internal metadata.

7. The system of claim 2, wherein searching the video frame for the internal metadata includes extracting the locations of people depicted in the video as the internal metadata.

8. The system of claim 2, wherein searching the video frame for the internal metadata includes extracting the relative locations of objects depicted in the video as the internal metadata.

9. The system of claim 8, further comprising extracting the relative position of people in the video to a fixed object.

10. The system of claim 9, wherein the fixed object is a basketball court.

Signed and Sealed this
Fourteenth Day of November, 2023

Katherine Kelly Vidal
*Director of the United States Patent and Trademark Office*

11. The system of claim 2, wherein the internal metadata is at least one subtitle.

12. The system of claim 1, wherein the video frame is obtained from a live stream.

13. The system of claim 1, wherein extracting the time from the video frame analyzed further comprises searching the video frame.

14. The system of claim 13, wherein searching the video frame further comprises automatically detecting coordinates of a clock on each video frame analyzed to extract the time from each video frame using optical character recognition.

15. The system of claim 1, wherein the logging client pulls the time-based metadata from a data server through a query.

16. The system of claim 1, wherein the logging client pulls the time-based metadata from a data server through an application programming interface.

17. The system of claim 1, wherein the data files are obtained from a sensor.